(12) United States Patent
Balluchi (10) Patent No.: US 12,379,994 B2
(45) Date of Patent: Aug. 5, 2025

(54) MEMORY ADDRESS TRANSLATION FOR DATA PROTECTION AND RECOVERY

(71) Applicant: Micron Technology, Inc., Boise, ID (US)

(72) Inventor: Daniele Balluchi, Cernusco Sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 251 days.

(21) Appl. No.: 18/204,821

(22) Filed: Jun. 1, 2023

(65) Prior Publication Data

US 2023/0393939 A1 Dec. 7, 2023

Related U.S. Application Data

(60) Provisional application No. 63/348,258, filed on Jun. 2, 2022.

(51) Int. Cl.
*G06F 11/10* (2006.01)
*G06F 12/10* (2016.01)

(52) U.S. Cl.
CPC ...... *G06F 11/1076* (2013.01); *G06F 11/1028* (2013.01); *G06F 12/10* (2013.01); *G06F 2212/403* (2013.01)

(58) Field of Classification Search
CPC .. G06F 11/1076; G06F 11/1028; G06F 12/10; G06F 2212/403
USPC ....... 714/710, 718, 763, 766, 768, 769, 770, 714/773, 784, 799, 800, 6.24, 6.32
See application file for complete search history.

(56) References Cited

U.S. PATENT DOCUMENTS

| | | | | |
|---|---|---|---|---|
| 9,471,512 | B2* | 10/2016 | Frost | G06F 12/0607 |
| 12,197,631 | B2* | 1/2025 | Caraccio | G06F 21/602 |
| 2017/0206036 | A1* | 7/2017 | Pax | G06F 3/0688 |
| 2022/0207193 | A1* | 6/2022 | Caraccio | G06F 21/79 |
| 2023/0214119 | A1* | 7/2023 | Sforzin | G06F 11/1068 |
| | | | | 714/6.21 |
| 2023/0236933 | A1* | 7/2023 | Thirumala | G06F 11/1004 |
| | | | | 714/6.24 |
| 2023/0376212 | A1* | 11/2023 | Chae | G06F 12/0246 |
| 2023/0393939 | A1* | 12/2023 | Balluchi | G06F 11/1076 |
| 2023/0393940 | A1* | 12/2023 | Del Gatto | G06F 11/1096 |
| 2025/0110668 | A1* | 4/2025 | Zhang | G06F 3/0659 |

OTHER PUBLICATIONS

Nair et al., Citadel: Efficiently Protecting Stacked Memory from Large Granularity Failures, 2014, IEEE, pp. 51-62. (Year: 2014)*
U.S. Appl. No. 17/543,039, filed Dec. 6, 2021, titled "Memory Management", 45 pages.

* cited by examiner

*Primary Examiner* — John J Tabone, Jr.
(74) *Attorney, Agent, or Firm* — Brooks, Cameron & Huebsch, PLLC (57) ABSTRACT

Address translation of host commands to access host data stored in memory devices that provides a chip kill capability not only involves locating where the host data is stored, but also involves locating where parity data striped with the host data is stored. In locating where the parity data is stored, the address translation can be performed with logical (e.g., arithmetic) operations.

20 Claims, 5 Drawing Sheets

450 →

RECEIVING A HOST COMMAND INCLUDING A FIRST ADDRESS BIT INDICATIVE OF A FIRST NUMERICAL VALUE ASSIGNED TO A ROW SEGMENT OF A FIRST MEMORY DEVICE CONFIGURED FOR FIRST DATA AND A SECOND ADDRESS BIT INDICATIVE OF A SECOND NUMERICAL VALUE ASSIGNED TO A FIRST CHANNEL CORRESPONDING TO THE FIRST MEMORY DEVICE — 452

IDENTIFYING A SECOND CHANNEL CORRESPONDING TO A SECOND MEMORY DEVICE CONFIGURED FOR SECOND DATA THAT ARE STRIPED WITH THE FIRST DATA BASED AT LEAST IN PART ON COMPARING THE FIRST AND SECOND NUMERICAL VALUES — 454

MEMORY ADDRESS TRANSLATION FOR DATA PROTECTION AND RECOVERY

PRIORITY INFORMATION

This application claims the benefit of U.S. Provisional Application Ser. No. 63/348,258, filed on Jun. 2, 2022, the contents of which are incorporated herein by reference.

TECHNICAL FIELD

The present disclosure relates generally to semiconductor memory and methods, and more particularly, to apparatuses, systems, and methods for memory address translation for data protection and recovery.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIG. 3 is a diagram illustrating another example data placement over memory devices and logical to physical address translation of host address bits of a host command in accordance with a number of embodiments of the present disclosure.

DETAILED DESCRIPTION

Systems, apparatuses, and methods related to memory address translation for data protection and recovery. Data protection and recovery schemes are often an important aspect of RAS (Reliability, Availability, and Serviceability) associated with memory systems. Such schemes may provide a "chip kill", in which the memory system can work properly even if a constituent chip, such as a memory die, is damaged; thereby, avoiding a situation of one of the chips being a single point of failure (SPOF) of the memory system. Often, the chip kill capability is provided through various error correction code (ECC) schemes including a "Redundant Array of Independent Disks" (RAID) scheme, etc., which allow data recovery of the damaged chip by reading all of the constituent chips of the RAID stripe.

The chip kill can involve ECC data (e.g., RAID parity) that are specifically designed for data recovery of the damaged chip. The ECC data and user data that share the same ECC data can be referred to as being striped together. Alternatively speaking, a stripe can include the user data and the ECC data shared by the user data.

When a host command is received to access data in the memory device, a memory system can be tasked with mapping the logical address provided by the host command to a physical address of the physical memory device where the data is located or stored. In an example where the memory devices are operated with a chip kill capability, address translation of a host command to specify a location configured for particular user data also involves specifying a location configured for ECC data striped with the user data, which often involves complex forms of operations, such as a division operation on values indicated by address bits of the host command. Such operations (e.g., division operations) can be time-consuming and substantially exhaust an amount of resources of the memory system, which can incur substantial latencies in operating the memory system.

In contrast, embodiments described herein are directed to memory address translation that do not require complex forms of operations. For example, rather than division operations that have been used in address translation of previous approaches, the address translation of the embodiments described herein can just involve less complex arithmetic operations, such as addition and/or subtraction operations. Accordingly, the embodiments described herein can reduce latencies associated with translating address bits of host commands and eliminate a need for circuitries for performing the complex forms of operations in association with address translation.

In some embodiments, the memory system can be a compute express link (CXL) compliant memory system. The host interface can be managed with CXL protocols and be coupled to the host via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
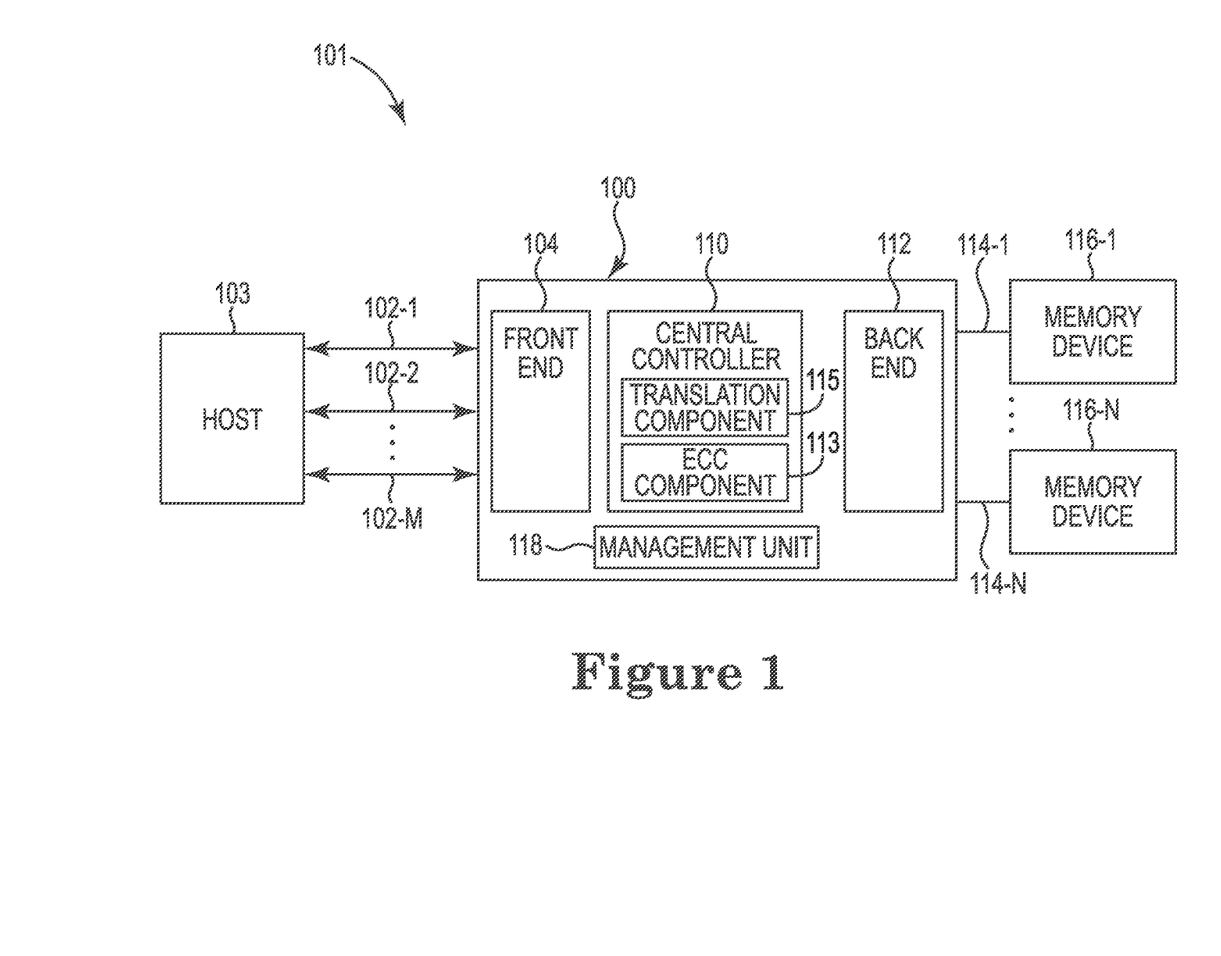
FIG. 1 is a functional block diagram of a computing system including a memory controller in accordance with a number of embodiments of the present disclosure.

FIG. 1 is a functional block diagram of a computing system 101 including a memory controller 100 in accordance with a number of embodiments of the present disclosure. The memory controller 100 can include a front end portion 104, a central controller portion 110, and a back end portion 112. The computing system 101 can include a host 103 and memory devices 116-1, . . . , 116-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port. In at least one embodiment, the interface between the memory controller 100 and the host 103 can be a PCIe physical and electrical interface operated according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 116 or a write operation to write data to a memory device 116.

The central controller portion 110 can include an ECC component 113. The ECC component 110 can generate error detection information and/or error correction information based on data received from the host 103. The ECC component 110 can perform error detection operations and/or error correction operations on data received from the host 103 or from the memory devices 116.

An example of an error correction operation that can be performed at the ECC component 113 is a RAID operation. The RAID operation can provide a chip kill protection using parity data stored in the memory devices 116 and/or update the parity data based on new host data (e.g., data received from the host 103). As used herein, the terms "user data" or "host data" are used interchangeably herein and can have the same meaning, as appropriate to the context.

The chip kill protection against any single memory device 116 (chip) failure and/or multi-bit error from any portion of a single memory chip can be implemented collectively across subsets of the memory devices 116 (e.g., the chip kill protection can be provided for a first subset of the memory devices 116-1, 116-2 and separately for a second subset of the memory devices 116-(N-1), 116-N) or across all of the memory devices 116.

The ECC component 113 can further update the parity data. For example, the ECC component 113 can receive new host data as part of host write commands, update the parity data based on the received host data and write the updated parity data back to the memory device 116.

An example of an error detection operation that can be performed at the ECC component 113 is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. The ECC component 113 can generate a check value resulting from an algebraic calculation on data received from the back end portion 112 and a comparison of that check value with a check value received from the memory device 116 to determine whether the data includes an error (e.g., if the two check values are not equal).

The central controller portion 110 can include a translation component 115. The translation component 115 can be responsible for address translations between a logical address (e.g., row identifier (ID), channel number, etc.) and a physical address that are associated with the memory devices 116. As used herein, "address translation" refers to determining a physical address of a memory of a memory device (e.g., the memory device 116) that corresponds to a logical address indicated by address bits of host commands (e.g., a command received from the host 103 to access one or more memory devices 116). Although not shown in FIG. 1, the translation component 115 can include circuitry to facilitate address translation associated with accessing the memory devices 116. In some embodiments, the translation component 115 can include special purpose circuitry in the form of an ASIC, FPGA, state machine, and/or other logic circuitry. As used herein, address bits of host commands can be alternatively referred to as "host address bits".

Host address bits can indicate, when translated, a physical location of the memory devices 116 configured for (e.g., storing) host data to be accessed by the host command. Further, a physical location of the memory devices 116 configured for parity data striped with the host data can be indicated by performing logical operations, such as compare operations and/or simple arithmetic operations (e.g., addition and/or subtraction operations), using some of the host address bits.

The back end portion 112 can include a media controller and a physical (PHY) layer that couples the memory controller 100 to the memory devices 116. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 114-1, . . . , 114-N. The channels 114 can include various types data buses, such as a sixteen-pin data bus and a two-pin data mask inversion (DMI) bus, among other possible buses.

An example of the memory devices 116 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In some embodiments, although the memory devices 116 are LPDDRx memory devices, the memory devices 116 do not include circuitry configured to provide low-power functionality for the memory devices 116 such as a dynamic voltage frequency scaling core (DVFSC), a sub-threshold current reduce circuit (SCRC), or other low-power functionality providing circuitry. Providing the LPDDRx memory devices 116 without such circuitry can advantageously reduce the cost, size, and/or complexity of the LPDDRx memory devices 116. By way of example, an LPDDRx memory device 116 with reduced low-power functionality providing circuitry can be used for applications other than mobile applications (e.g., if the memory is not intended to be used in a mobile application, some or all low-power functionality may be sacrificed for a reduction in the cost of producing the memory).

Host/parity data can be stored in the memory devices 116 in a particular pattern. In some embodiments, parity data can be stored in a different row segment than those row segments where host data are stored. As used herein, the term "row segment" refers to a group of rows of memory cells distributed across different memory devices (e.g., the memory devices 116). Further, in some embodiments, no more than a single row of memory cells of each memory device can be configured for each stripe.

In some embodiments, the memory controller 100 can include a management unit 118 to initialize, configure, and/or monitor characteristics of the memory controller 100. The management unit 118 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2:
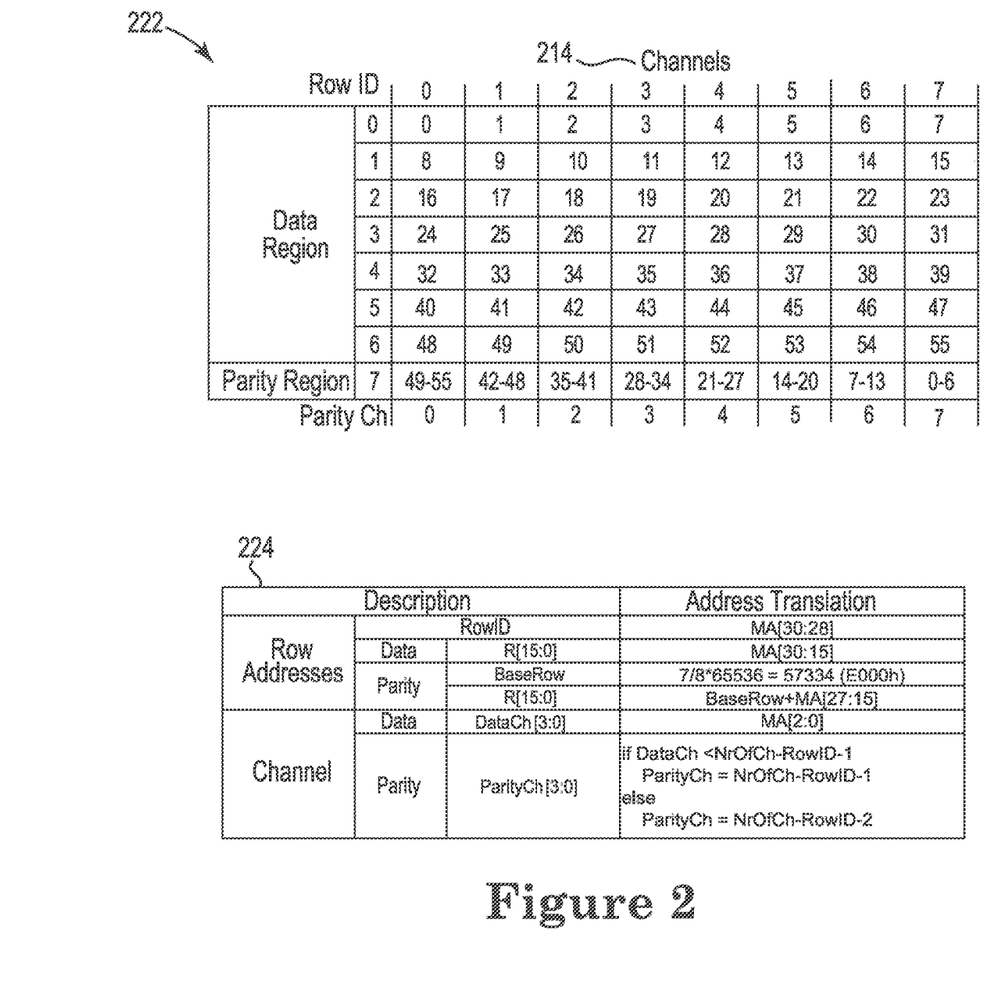
FIG. 2 is a diagram illustrating example data placement over memory devices and logical to physical address translation of host address bits of a host command in accordance with a number of embodiments of the present disclosure.

FIG. 2 is a diagram illustrating example data placement over memory devices (e.g., the memory devices 116 illustrated in FIG. 1) and logical to physical address translation of host address bits in accordance with a number of embodiments of the present disclosure. As illustrated in FIG. 2, there are eight channels 214, numbered 0 to 7 ("0" to "7" shown in a first row of the table 222) and eight row segments having row IDs 0 to 7 ("0" to "7" shown in a first column of the table 222). Each row segment includes rows of memory cells (not illustrated in FIG. 2) of multiple memory devices (e.g., the memory devices 116). For the purpose of illustration, data stored in each intersection of row segments and channels is also numbered. For example, data 1 is stored in a row segment having a row ID 0 and located on a channel 1. Embodiments are not limited to a particular number of channels, rows, row segments, and/or a number of memory devices.

As further illustrated in FIG. 2, first 7 row segments respectively having row IDs 0 to 6 can be a data region where host data can be stored and a last row segment having a row ID 7 can be a parity region where parity data can be stored. For example, groups of rows of memory cells on channels 0 to 7, and forming a first row segment (having a row ID 0), can be respectively configured for data 0 to 7; groups of rows of memory cells on channels 0 to 7, and forming a second row segment (having a row ID 1), can be respectively configured for data 8 to 15; groups of rows of memory cells on channels 0 to 7, and forming a third row segment (having a row ID 2), can be respectively configured for data 16 to 23; groups of rows of memory cells on channels 0 to 7, and forming a fourth row segment (having a row ID 3), can be respectively configured for data 24 to 31; groups of rows of memory cells on channels 0 to 7, and forming a fifth row segment (having a row ID 4), can be respectively configured for data 32 to 39; groups of rows of memory cells on channels 0 to 7, and forming a sixth row segment (having a row ID 5), can be respectively configured for data 40 to 47; and groups of rows of memory cells on channels 0 to 7, and forming a seventh row segment (having a row ID 6), can be respectively configured for data 48 to 55.

Data (e.g., host data) that are striped together can be sequentially distributed across the channels 0 to 7. For example, the host data 0 to 6 are sequentially distributed across channels 0 to 6 (e.g., 0, 1, 2, 3, 4, 5, 6), the host data 7 to 13 are sequentially distributed across channels 7 to 5 (e.g., 7, 0, 1, 2, 3, 4, 5), the host data 14 to 20 are sequentially distributed across channels 6 to 4 (e.g., 6, 7, 0, 1, 2, 3, 4), the host data 21 to 27 are sequentially distributed across channels 5 to 3 (e.g., 5, 6, 7, 0, 1, 2, 3), the host data 28 to 34 are sequentially distributed across channels 4 to 2 (e.g., 4, 5, 6, 7, 0, 1, 2), the host data 35 to 41 are sequentially distributed across channels 3 to 1 (e.g., 3, 4, 5, 6, 7, 0, 1), the host data 42 to 48 are sequentially distributed across channels 2 to 0 (e.g., 2, 3, 4, 5, 6, 7, 0), and the host data 49 to 55 are sequentially distributed across channels 1 to 7 (e.g., 1, 2, 3, 4, 5, 6, 7).

Further, groups of rows of memory cells on channels 0 to 7 and forming an eighth row segment (having a row ID 7) can be configured for parity data. For example, parity data on channel 0 is striped with host data 49 to 55; parity data on channel 1 is striped with host data 42 to 48; parity data on channel 2 is striped with host data 35 to 41; parity data on channel 3 is striped with host data 28-34; parity data on channel 4 is striped with host data 21 to 27; parity data on channel 5 is striped with host data 14 to 20; parity data on channel 6 is striped with host data 7 to 13; and parity data on channel 7 is striped with host data 0 to 6.

A table 224 shown in FIG. 2 illustrates example address translation for locating where host/parity data are stored. As shown in 224, a portion of the host address bits "MA[30:

28]" can indicate a row ID that indicates a particular group segment configured for data to be accessed by the host command. Although embodiments are not so limited, 3 most significant bits (MSBs) can be assigned for indicating a row ID. As further shown in FIG. 2, a portion of the host address bits "MA[30:15]" can be translated to indicate a row of memory cells (e.g., within the row segment indicated by host address bits "MA[30:28]") configured for data to be accessed by the host command.

A row of memory cells configured for corresponding parity data can be located using host address bits "MA[27: 15]" and a base row ("BaseRow"). A numerical value (e.g., of a logical address) assigned to the base row can be determined based on a known total quantity of rows and a ratio of a known quantity of data regions to a known total quantity of regions (e.g., including data and parity regions). In an example illustrated in FIG. 2, the ratio is 7/8 given that a quantity of data regions is 7 and a total quantity of regions is 8; therefore, the numerical value assigned to the base row is calculated to be 57344 (e.g., 65536*7/8=57344). Accordingly, the base row is a row having an assigned numerical value (e.g., of a logical address) of 57344. The host address bits "MA[27:15]" indicates a relative location of a row of memory cells (configured for parity data) in relation to the base row. Accordingly, a logical address of the row configured for parity data can be located based on a combination of a base row and "MA[27:15]".

As further shown in the table 224, a portion of the host address bits (MA[2:0]) can be translated to indicate a data channel. As used herein, the term "data channel" refers to a particular channel coupled to (alternatively referred to as "corresponding to") a memory device configured for particular host data to be accessed by the host command. Further, the term "parity channel" refers to a particular channel coupled to (alternatively referred to as "corresponding to") a memory device configured for particular parity data striped with host data to be accessed by the host command.

As shown in the table 224, a parity channel can be located using "MA[2:0]", "MA[30:28]", and a total quantity of channels ("NrOfCh"). An example pseudocode for locating a parity channel is illustrated below:

---
if DataCh < NrOfCh-RowID-1
    ParityCh= NrOfCh-RowID-1
else
    ParityCh= NrOfCh-RowID-2
---

As illustrated in the example pseudocode, if a numerical value indicated by "MA[2:0]" is less than "NrOfCh-RowID-1", the parity channel can be located based on "NrOfCh-RowID-1". In contrast, if a numerical value indicated by "MA[2:0]" is not less than "NrOfCh-RowID-1", the parity channel can be specified based on "NrOfCh-RowID-2".

In an example of FIG. 2 where a host command is to access data 5, "MA[2:0]" indicates (a numerical value of) 5, a "MA[30:28]" indicates (a numerical value of) 0, and a total quantity of channels is 8. In this example, a resulting numerical value corresponding to a parity channel is calculated based on "NrOfCh-RowID-1" (e.g., 8−0−1=7) because "MA[2:0]" (e.g., 5) is less than "NrOfCh-RowID-1" (e.g., 8−0−1=7). This indicates that a channel having an assigned numerical value of 7 is a parity channel (e.g., a channel coupled to a memory device configured for parity data striped with the data 5).

In another example where a host command is to access data 51, "MA[2:0]" indicates (a numerical value of) 3, a "MA[30:28]" indicates (a numerical value of) 6, and a total quantity of channels is 8. In this example, a resulting numerical value corresponding to a parity channel is calculated based on "NrOfCh-RowID-2" (e.g., 8−6−2=0) because "MA[2:0]" (e.g., 3) is not less than "NrOfCh-RowID-1" (e.g., 8−6−1=1). This indicates that a channel having an assigned numerical value of 0 is configured for parity data striped with the data 51. In some embodiments, attempts/requests to indicate a row ID corresponding to a parity region via host address bits "MA[30:28]" (e.g., by indicating a numerical value of "7" via "MA[30:28]") can be responded/followed by "invalid address" and/or "invalid" response; thereby, making the attempts/requests failed.

In a non-limiting example, an apparatus (e.g., the computing system 101 illustrated in FIG. 1) can include a number of memory devices (e.g., the memory devices 116 illustrated in FIG. 1) respectively corresponding to a number of channels (e.g., the channels 114 illustrated in FIG. 1). The apparatus can further include a controller (e.g., the memory controller 100 illustrated in FIG. 1) corresponding to the number of memory devices via the number of channels. In this example, the controller can be configured to receive a first address bit of a host command. The first address bit ("MA[30:28]" illustrated in FIGS. 2 and 3) can be indicative of a first numerical value assigned to a row segment of a first memory device configured for first data. The controller can be further configured to receive a second address bit of the host command. The second address bit ("MA[2:0]" illustrated in FIGS. 2 and 3) can be indicative of a second numerical value assigned to a first channel (e.g., the channel 114 illustrated in FIG. 1) of the number of channels. The controller can be further configured to compare, in response to receipt of the host command, the first and second numerical values to identify a second channel corresponding to a second memory device (e.g., the memory device 116 illustrated in FIG. 1) configured for second data striped with the first data. As used herein, the terms "locate" or "identify" are used interchangeably herein and can have the same meaning, as appropriate to the context. The controller can be further configured to execute the host command by accessing the first memory device based at least in part on the first and the second address bits and accessing the second memory device based at least in part on a result of the comparison.

In some embodiments, the number of memory devices can include a number of row segments (e.g., the row segments respectively having row IDs 0 to 7 illustrated in FIG. 2) each comprising a respective set of rows of memory cells (e.g., rows 0 to 7, 8192 to 8199, and/or 57344 to 57351 shown in FIG. 3) of each of the number of memory devices. Continuing with this example, the number of memory devices can be configured for the first data and the second data in a first or a second pattern. Further, the host command can further include a third address bit ("MA[17:15]" illustrated in FIG. 3) indicative of how far the first data or the second data in the second pattern has shifted from the first channel across the number of channels as a result of the distribution as compared to the first data or the second data in the first pattern. The controller can be configured to identify a channel (e.g., the channel 114 illustrated in FIG. 1) corresponding to the first memory device based at least in part on the second address bit and the third address bit. In some embodiments, a particular row segment of the number of row segments can be configured for parity data.

FIG. 3 is a diagram illustrating another example data placement over memory devices (e.g., the memory devices 116 illustrated in FIG. 1) and logical to physical address translation of host address bits in accordance with a number of embodiments of the present disclosure. A table 332 shows which types of logical addresses each portion of host address bits corresponds to. For example, as shown in the table 332, three host address bits ("30:28" shown in FIG. 3) are indicative of (alternatively referred to as "assigned to") a row ID ("RowID" shown in FIG. 3), ten host address bits ("27:18" shown in FIG. 3) are indicative of other information ("Others" shown in FIG. 3), such as a relative location of a row of memory cells configured for parity data in relation to a base row (e.g., row 57344 shown in FIG. 3), three host address bits ("17:15" shown in FIG. 3) are indicative of how far host/parity data in one pattern (e.g., a pattern in which data are stored and as shown in 334) has shifted as compared to the host/parity data in another pattern (e.g., a pattern in which data are stored and as shown in 338) ("Scr" shown in FIG. 3), and sixteen host address bits ("30:15" shown in FIG. 3) are indicative of a row of memory cells ("Row" shown in FIG. 3) configured for data to be accessed by the host command. Embodiments are not limited to a particular quantity of channels, rows, row segments, and/or a number of host bits a host command can include.

As illustrated in 334, 336, and 338 of FIG. 3, there are eight channels, numbered 0 to 7 ("0" to "7" shown in a first row of each table 334, 336, and 338) and eight row segments having row IDs 0 to 7 ("0" to "7" shown in a first column of each table 334, 336, and 338). Although not fully illustrated in 334, 336, and 338 of FIG. 3, first 7 row segments respectively having row IDs 0 to 6 can be a data region where host data are stored. A last row segment including a group of rows 57344 to 57351 of each memory device can be a parity region where parity data are stored.

Each row segment includes rows of memory cells of multiple memory devices (e.g., the memory devices 116). For example, a first row segment (e.g., a row segment having a row ID 0) includes a group of rows 0 to 7 of each memory device, a second row segment (e.g., a row segment having a row ID 1) includes a group of rows 8192 to 8199 of each memory device, and a third row segment (e.g., a row segment of a parity region) includes a group of rows 57344 to 57341 of each memory device. For the purpose of illustration, data stored in each intersection of rows and channels is also numbered. In an example illustrated in 334, data 1 is stored in a row 0 located on a channel 1. In an example illustrated in 338, data 15 is stored in a row 1 located on a channel 6.

Data placement shown in 334 is analogous to the data placement shown in FIG. 2. For example, first rows (e.g., row 0) on channels 0 to 7 can be respectively configured for data 0 to 7; second rows (e.g., row 1) on channels 0 to 7 can be respectively configured for data 8 to 15; third rows (e.g., row 2) on channels 0 to 7 can be respectively configured for data 16 to 23; fourth rows (e.g., row 3) on channels 0 to 7 can be respectively configured for data 24 to 31; fifth rows (e.g., row 4) on channels 0 to 7 can be respectively configured for data 32 to 39; sixth rows (e.g., row 5) on channels 0 to 7 can be respectively configured for data 40 to 47; seventh rows (e.g., row 6) on channels 0 to 7 can be respectively configured for data 48 to 55; and eight rows (e.g., row 7) on channels 0 to 7 can be respectively configured for data 56 to 63.

Data placement shown in 336 corresponds to the data placement shown in 334 and illustrates which data/parity locations are striped together. As an example, host data 0 to 6 and parity data 0 having a stripe ID 0 are striped together and host data 7 and 65536 to 65541 and parity data 8192 having a stripe ID 8192 are striped together.

A pattern in which the memory devices are configured for host/parity data in data placement shown in 338 is different than a pattern in which the memory devices are configured for host/parity data in data placement shown in 334. The memory devices are configured for host/parity data in a "scrambled" manner as shown in 338.

In some embodiments, host/parity data can be shifted across the channels 0 to 7 in an incremental pattern across memory devices (e.g., across channels). In one example, data 15 that is placed on (e.g., stored in a memory device coupled to) a channel 7 in 334 is shifted by 1 to be placed on a channel 6, data 23 that is placed on a channel 7 in 334 is shifted by 2 (e.g., incremented from 1 by 1) to be placed on a channel 5, data 31 that is placed on a channel 7 in 334 is shifted by 3 (e.g., incremented from 2 by 1) to be placed on a channel 4 (e.g., incremented from 2 by 1), data 39 that is placed on a channel 7 in 334 is shifted by 4 (e.g., incremented from 3 by 1) to be placed on a channel 3, data 47 that is placed on a channel 7 in 334 is shifted by 5 (e.g., incremented from 4 by 1) to be placed on a channel 2, data 55 that is placed on a channel 7 in 334 is shifted by 6 (e.g., incremented from 5 by 1) to be placed on a channel 1, and data 63 that is placed on a channel 7 in 334 is shifted by 7 (e.g., incremented from 6 by 1) to be placed on a channel 0.

In another example, data 65550 that is placed on a channel 6 in 334 is shifted by 1 to be placed on a channel 5, data 65558 that is placed on a channel 6 in 334 is shifted by 2 (e.g., incremented from 1 by 1) to be placed on a channel 4, data 65566 that is placed on a channel 3 in 334 is shifted by 3 (e.g., incremented from 2 by 1) to be placed on a channel 3, data 65574 that is placed on a channel 6 in 334 is shifted by 4 (e.g., incremented from 3 by 1) to be placed on a channel 2, data 65582 that is placed on a channel 6 in 334 is shifted by 5 (e.g., incremented from 4 by 1) to be placed on a channel 1, data 65590 that is placed on a channel 6 in 334 is shifted by 6 (e.g., incremented from 5 by 1) to be placed on a channel 0, and data 65598 that is placed on a channel 6 in 334 is shifted by 7 (e.g., incremented from 6 by 1) to be placed back in a channel 7.

A table 340 shown in FIG. 3 illustrates example address translation for locating where host/parity data are stored when the memory devices are configured for host/parity data according to a pattern shown in 338. For example, a portion of the host address bits "MA[30:28]" can be translated to indicate a row ID that indicates a particular group segment configured for data to be accessed by the host command. Although embodiments are not so limited, 3 most significant bits (MSBs) can be assigned for indicating a row ID. Further, a portion of the host address bits "MA[30:15]" can be translated to indicate a row of memory cells (e.g., within the row segment indicated by "MA[30:28]") configured for data to be accessed by the host command.

Similarly, a row of memory cells configured for corresponding parity data can be located using "MA[27:15]" and a base row ("BaseRow"). A numerical value (e.g., of a logical address) assigned to the base row can be determined based on a known total quantity of rows and a ratio of a known quantity of data regions to a known total quantity of regions (e.g., including data and parity regions). In an example illustrated in FIG. 2, the ratio is 7/8 given that a quantity of data regions is 7 and a total quantity of regions is 8; therefore, the numerical value assigned to the base row is calculated to be 57344 (e.g., 65536*7/8=57344). Accordingly, the base row is a row having an assigned numerical value of 57344. The host address bits "MA[27:15]" indicates a relative location of a row of memory cells (configured for parity data) in relation to the base row. Accordingly, a logical address of the row configured for parity data can be located based on a combination of a base row and "MA[27:15]".

An example pseudocode for determining a base parity channel is illustrated below:

```
if MA[2:0] < NrOfCh-RowID-1
    DParityCh= NrOfCh-RowID-1
else
    DParityCh= NrOfCh-RowID-2
```

In contrast to the example illustrated in 224, in which a parity channel was located using "MA[2:0]", a parity channel is located using a combination of "MA[2:0]" and "MA[17:15]" in the example illustrated in 340. In this example, "MA[2:0]" can be used to locate a base parity channel and "MA[17:15]" can be translated to indicate how far it has shifted from the base parity channel. A base parity channel can be located in a similar manner described in connection with 224. In one example, if a numerical value indicated by "MA[2:0]" is less than "NrOfCh-RowID-1", the base parity channel can be located based on "NrOfCh-RowID-1". In another example, if a numerical value indicated by "MA[2:0]" is not less than "NrOfCh-RowID-1", the base channel can be specified based on "NrOfCh-RowID-2".

For example, as shown in 338, a row configured for data 15 that is placed on the channel 7 in 334 is placed on the channel 6 in 338. In this example, address bits "MA[2:0]" are translated to indicate a channel 7 as a base data channel and address bits "MA[17:15]" are translated to indicate an amount of shifts across channels, such as "1". Accordingly, a combination of "MA[2:0]" and "MA[17:15]" indicates (that data 15 has shifted from the channel 7 by 1 across the memory device and/or channels and) that data 15 is placed on the channel 6.

In some embodiments, attempts/requests to indicate a row ID corresponding to a parity region via host address bits "MA[30:28]" can be responded/followed by "invalid address" and/or "invalid" response; thereby, making the attempts/requests failed. Rather, a parity channel can be indicated based on how far it has shifted from a base parity channel ("DParityCh" shown in FIG. 3). A base parity channel is calculated based on the address bits "MA[2:0]" in a similar manner described in connection with 224. For example, a numerical value indicated by "MA[2:0]" (e.g., 7) is not less than "NrOfCh-RowID-1" (e.g., 8−0−1=7); therefore, a base parity channel is a channel having an assigned numerical value equal to "NrOfCh-RowID-2" (e.g., 8−0−2=6), which indicates that a channel 6 is a base parity channel. This further indicates that a parity channel is a channel that has shifted from the base parity channel (e.g., channel 6) by 1 (as indicated by "MA[17:15]"), which indicates that a channel 5 is a parity channel. This matches with how it is illustrated in 338 as parity data 8193 striped with data 15 is on a channel 5 as shown in FIG. 3.

In a non-limiting example, an apparatus (e.g., the computing system 101 illustrated in FIG. 1) can include a number of memory devices (e.g., the memory devices 116 illustrated in FIG. 1) respectively corresponding to a number of channels (e.g., the channels 114 illustrated in FIG. 1). The number of memory devices can include a number of row segments (e.g., row segments respectively having row IDs 0 to 7 shown in FIG. 2) each include a respective set of rows of memory cells (e.g., rows 0 to 7, 8192 to 8199, and/or 57344 to 57351 shown in FIG. 3) of each memory device of the number of memory devices. The apparatus further includes a controller (e.g., the memory controller 100 illustrated in FIG. 1) coupled to the number of memory devices via the number of channels. The controller can be configured to receive a host command. The host command can include a first address bit ("MA[30:28]" illustrated in FIGS. 2 and 3) indicative of a first numerical value assigned to a row segment of the number of row segments configured for host data. The host command can further include a second address bit ("MA[2:0]" illustrated in FIGS. 2 and 3) indicative of a second numerical value assigned to a base channel associated with a first memory device configured for the host data. The controller can be further configured to, to access the host data and parity data striped with the host data, compare the first and second numerical values to determine if the second numerical value is less than a difference between a particular amount and the first numerical value. Further controller can be configured to, to access the host data and parity data striped with the host data, identify a row of memory cells of the first memory device configured for the host data based at least in part on the first and second address bits and identify a second memory device and a row of memory cells configured for the parity data based at least in part on the comparison.

In some embodiments, the number of memory devices can be configured for host data and respective parity data of stripes in a first or a second pattern. Further, the host command can further include a third address bit indicative of how far the host data or the parity data in the second pattern has shifted across the number of channels from the base channel as compared to the host data or the parity data in the first pattern. In one example, a third memory device is configured for the parity data corresponding to a respective set of stripes when the number of devices are configured in the first pattern. In another example, the parity data corresponding to the respective set of stripes are distributed across the number of memory devices when the number of memory devices are configured for the parity data corresponding to the respective set of stripes in the second pattern. In some embodiments, the controller is configured to identify a channel corresponding to the first memory device or the second memory device based at least in part on the second address bit and the third address bit.

In some embodiments, the particular amount can be less than a quantity of the number of channels (e.g., "NrOfCh" illustrated in connection with FIGS. 2 and 3) by one ("1"). In this example, the controller can be configured to determine, in response to the second numerical value being determined to be less than the difference, that a channel having a channel number that is equal to the difference is a base parity channel. Continuing with this example, the controller can be further configured to determine, in response to the second numerical value being determined to be not less than the difference, that a channel having a channel number that is less than the difference by one is a base parity channel. The controller can be configured to identify a channel corresponding to the second memory device based on the channel number of the base parity channel and the third address bit.

In some embodiments, the controller can be configured to identify a row of memory cells configured for the parity data based at least in part on the third address bit and an address of a base row of memory cells of the particular row segment. The base row of memory cells is located based at least in part on a ratio of a quantity of row segments configured for parity data to a total quantity of row segments across the number of memory devices and a total number of rows of memory cells across the number of memory devices.

Figure 4:
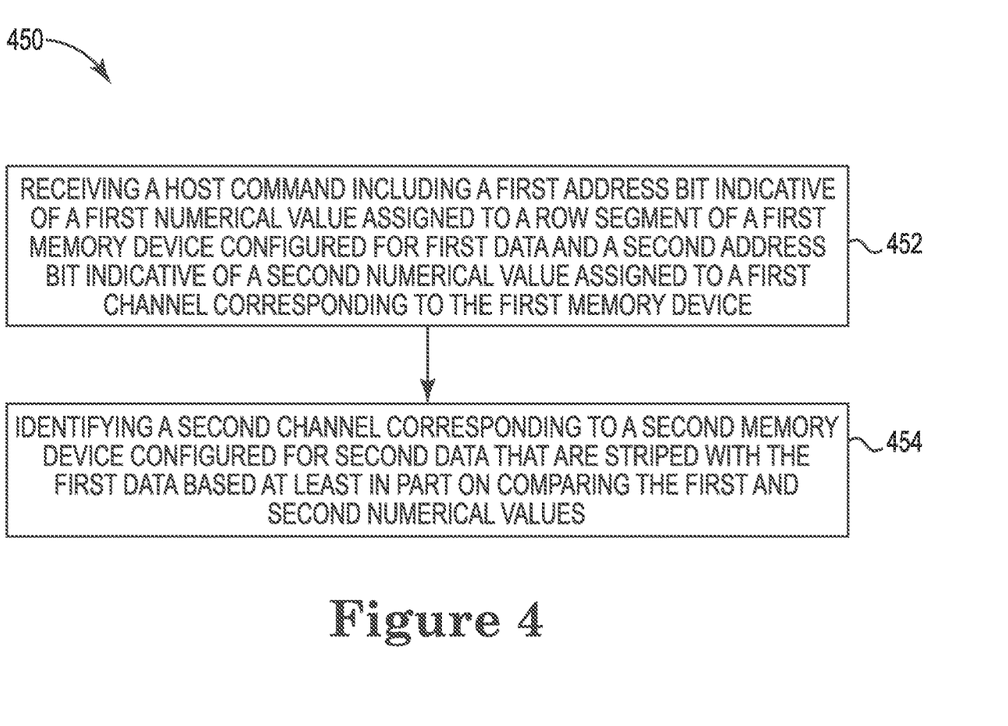
FIG. 4 is a flow diagram of a method for memory address translation for data protection and recovery in accordance with a number of embodiments of the present disclosure.

FIG. 4 is a flow diagram 450 of a method for memory address translation for data protection and recovery in accordance with a number of embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the memory controller 100 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 452, a host command including a first address bit ("MA[30:28]" illustrated in FIGS. 2 and 3) and a second address bit ("MA[2:0]" illustrated in FIGS. 2 and 3) is received (at the memory controller 100 from the host 103 illustrated in FIG. 1). The first address bit indicative of a first numerical value (e.g., a numerical value associated with "RowID" illustrated in FIGS. 2 and 3) assigned to a row segment of a first memory device (e.g., the memory device 116 illustrated in FIG. 1) configured for first data. The second address bit indicative of a second numerical value assigned to a first channel (e.g., the channel 114 illustrated in FIG. 1) corresponding to the first memory device.

At 454, a second channel can be identified based at least in part on comparing the first and second numerical values. The second channel corresponds to a second memory device (e.g., the memory device 116 illustrated in FIG. 1) configured for second data that are striped with the first data. In some embodiments, the address bits of the host command can be translated without performing a division operation on a numerical value indicated by any address bit of the host command.

In some embodiments, the first and the second numerical values can be compared by determining if the second numerical value is less than a third numerical value. The third numerical value (e.g., a numerical value associated with "DataCh" illustrated in FIG. 2 or "MA[2:0]" illustrated in FIG. 3) is less than, by a sum of the first numerical value and one ("1"), a quantity of the number of channels (e.g., "NrOfCh" illustrated in FIGS. 2 and 3). In this example, if the second numerical value is determined to be less than the third numerical value, the second channel can be located based at least in part on the third numerical value assigned to the second channel. If the second numerical value is determined to be not less than the third numerical value, the second channel can be located based at least in part on a fourth numerical value (e.g., a numerical value associated with "ParityCh" of "DParityCh" illustrated in connection with "NrOfCh-RowID-1" in FIGS. 2 and 3) assigned to the second channel and less than the third numerical value by one.

Figure 5:
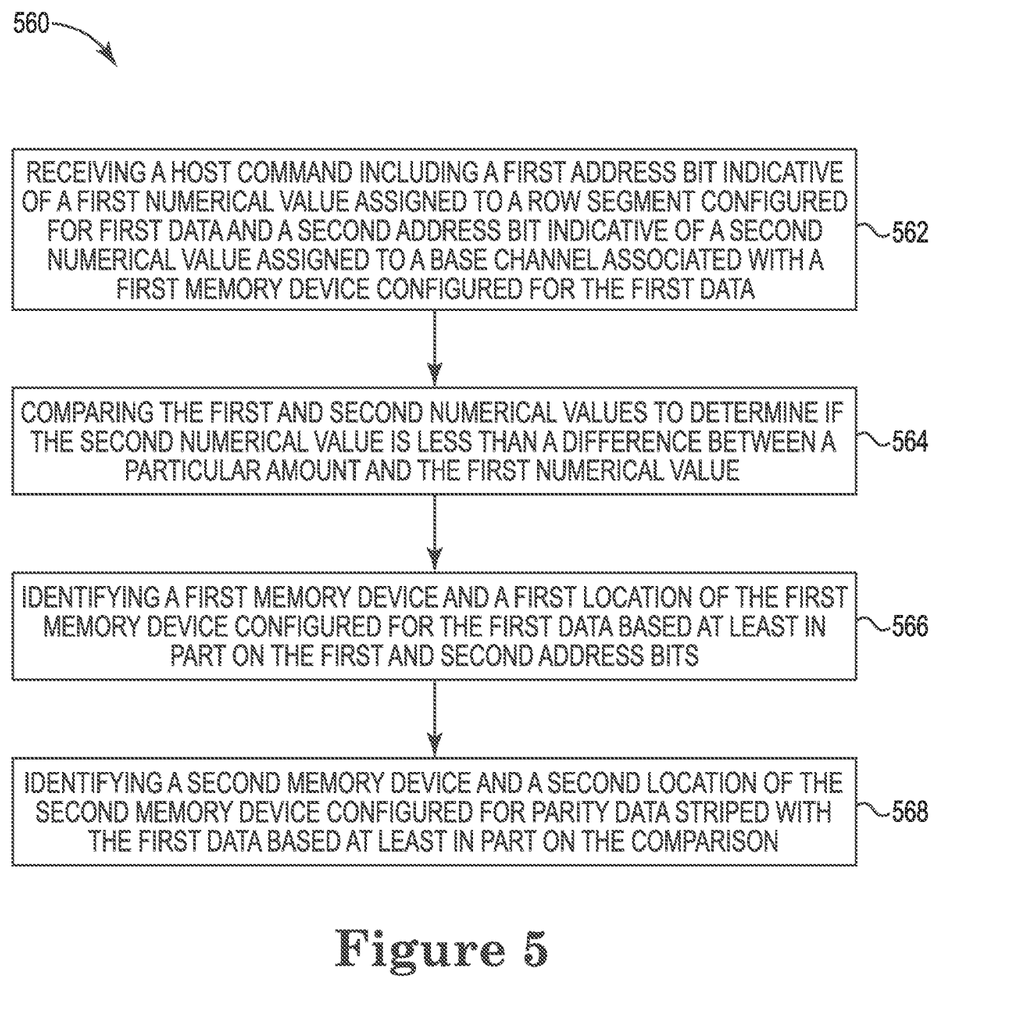
FIG. 5 is a flow diagram of a method for memory address translation for data protection and recovery in accordance with a number of embodiments of the present disclosure.

FIG. 5 is a flow diagram 560 of a method for memory address translation for data protection and recovery in accordance with a number of embodiments of the present disclosure. The method 560 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 560 is performed by the memory controller 100 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 562, a host command can be received (at the memory controller 100 from the host 103 illustrated in FIG. 1). The host command can include a first address bit ("MA[30:28]" illustrated in FIGS. 2 and 3) indicative of a first numerical value (e.g., a numerical value associated with "RowID" illustrated in FIGS. 2 and 3) assigned to a row segment configured for first data and a second address bit ("MA[2:0]" illustrated in FIGS. 2 and 3) indicative of a second numerical value assigned to a base channel (e.g., the channel 114 illustrated in FIG. 1) associated with a first memory device (e.g., the memory device 116 illustrated in FIG. 1) configured for the first data.

At 564, the first and second numerical values can be compared to determine if the second numerical value is less than a difference between a particular amount (e.g., a numerical value corresponding to "NrOfCh"-"1" illustrated in FIGS. 2 and 3) and the first numerical value. At 566, a first memory device (e.g., the memory device 116 illustrated in FIG. 1) and a first location of the first memory device configured for the first data can be identified based at least in part on the first and second address bits. At 568, a second memory device (e.g., the memory device 116 illustrated in FIG. 1) and a second location of the second memory device configured for parity data striped with the first data can be identified based at least in part on the comparison.

In some embodiments, if the second numerical value is determined to be less than the difference, the second location can be identified based at least in part on a third numerical value assigned to a channel corresponding to the second memory device. In this example, the third numerical value (e.g., a numerical value corresponding to "NrOfCh-RowID-1" in FIGS. 2 and 3) is equal to the difference.

In some embodiments, if the second numerical value is determined to be not less than the difference, the second location can be identified based at least in part on a third numerical value assigned to a channel corresponding to the second memory device. In this example, the third numerical value (e.g., a numerical value corresponding to "NrOfCh-RowID-2" in FIGS. 2 and 3) is less than the difference by one.

In some embodiments, the first memory device or the second memory device can be one of a number of memory devices respectively corresponding to a number of channels. The host command can further includes a third address bit ("MA[17:15]" illustrated in FIG. 3) indicative of a third numerical value indicating how far the first data or the second data has shifted across the number of channels from the base channel. In this example, the method 560 can include identifying the second memory device by identifying a channel corresponding to the second memory device based at least in part on the comparison and third address bits. In some embodiments, the first memory device can be identified by identifying a channel corresponding to the first memory device based at least in part on the second and third address bits.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving a host command including:
      a first address bit indicative of a first numerical value assigned to a row segment of a first memory device configured for first data; and
      a second address bit indicative of a second numerical value assigned to a first channel of a number of channels and corresponding to the first memory device; and
   identifying a second channel of the number of channels and corresponding to a second memory device configured for second data that are striped with the first data based at least in part on comparing the first and second numerical values.

2. The method of claim 1, wherein comparing the first and the second numerical values further comprises determining if the second numerical value is less than a third numerical value, wherein the third numerical value is less than, by a sum of the first numerical value and one, a quantity of the number of channels.

3. The method of claim 2, further comprising, in response to the second numerical value being determined to be less than the third numerical value, locating the second channel based at least in part on the third numerical value assigned to the second channel.

4. The method of claim 2, further comprising, in response to the second numerical value being determined to be not less than the third numerical value, locating the second channel based at least in part on a fourth numerical value assigned to the second channel and less than the third numerical value by one.

5. The method of claim 1, wherein:
   the first memory device or the second memory device is one of a number of memory devices respectively coupled to the number of channels; and
   the host command further includes a third address bit indicative of a third numerical value indicating how far the first data or the second data has shifted across the number of channels from the base channel;
   wherein the method further comprises identifying the second channel based at least in part on the comparison and third address bits.

6. The method of claim 5, further comprising identifying the first channel based at least in part on the second and third address bits.

7. An apparatus, comprising:
   a number of memory devices respectively corresponding to a number of channels; and
   a controller coupled to the number of memory devices via the number of channels, the controller configured to:
      receive a first address bit of a host command, the first address bit indicative of a first numerical value assigned to a row segment of a first memory device configured for first data;
      receive a second address bit of the host command, the second address bit indicative of a second numerical value assigned to a first channel of the number of channels;
      compare, in response to receipt of the host command, the first and second numerical values to identify a second channel corresponding to a second memory device configured for second data striped with the first data; and
      access the first memory device identified based at least in part on the first and the second address bits; and
      access the second memory device identified based at least in part on a result of the comparison.

8. The apparatus of claim 7, wherein the number of memory devices includes a number of row segments each comprising a respective set of rows of memory cells of each of the number of memory devices.

9. The apparatus of claim 8, wherein:
   the number of memory devices are configured for the first data and the second data in a first or a second pattern;
   the host command further comprises a third address bit indicative of how far the first data or the second data in the second pattern has shifted from the first channel across the number of channels as a result of the distribution as compared to the first data or the second data in the first pattern; and
   the controller is configured to identify a channel coupled to the first memory device based at least in part on the second address bit and the third address bit.

10. The apparatus of claim 8, wherein a particular row segment of the number of row segments is configured for parity data.

11. An apparatus, comprising:
   a number of memory devices respectively corresponding to a number of channels, wherein the number of memory devices comprise a number of row segments each comprising a respective set of rows of memory cells of each memory device of the number of memory devices; and
   a controller coupled to the number of memory devices via the number of channels, the controller configured to:
      receive a host command including:
         a first address bit indicative of a first numerical value assigned to a row segment of the number of row segments configured for host data; and a second address bit indicative of a second numerical value assigned to a base channel associated with a first memory device configured for the host data; and to access the host data and parity data striped with the host data:
compare the first and second numerical values to determine if the second numerical value is less than a difference between a particular amount and the first numerical value;
identify a row of memory cells of the first memory device configured for the host data based at least in part on the first and second address bits; and
identify a second memory device and a row of memory cells configured for the parity data based at least in part on the comparison.

12. The apparatus of claim 11, wherein:
the number of memory devices are configured for host data and respective parity data of stripes in a first or a second pattern; and
the host command further includes a third address bit indicative of how far the host data or the parity data in the second pattern has shifted across the number of channels from the base channel as compared to the host data or the parity data in the first pattern.

13. The apparatus of claim 12, wherein a third memory device is configured for the parity data corresponding to a respective set of stripes when the number of devices are configured in the first pattern.

14. The apparatus of claim 13, wherein the parity data corresponding to the respective set of stripes are distributed across the number of memory devices when the number of memory devices are configured for the parity data corresponding to the respective set of stripes in the second pattern.

15. The apparatus of claim 12, wherein the controller is configured to identify a channel coupled to the first memory device or the second memory device based at least in part on the second address bit and the third address bit.

16. The apparatus of claim 12, wherein the particular amount is less than a quantity of the number of channels by one.

17. The apparatus of claim 16, wherein the controller is configured to:
determine, in response to the second numerical value being determined to be less than the difference, that a channel having a channel number that is equal to a numerical value corresponding to the difference is a base parity channel; and
determine, in response to the second numerical value being determined to be not less than the difference, that a channel having a channel number that is less than the difference by one is a base parity channel.

18. The apparatus of claim 17, wherein the controller is configured to identify a channel coupled to the second memory device based on the channel number of the base parity channel and the third address bit.

19. The apparatus of claim 12, wherein the controller is configured to identify a row of memory cells configured for the parity data based at least in part on the third address bit and an address of a base row of memory cells of the particular row segment.

20. The apparatus of claim 19, wherein the base row of memory cells is located based at least in part on:
a ratio of a quantity of row segments configured for parity data to a total quantity of row segments across the number of memory devices; and
a total number of rows of memory cells across the number of memory devices.

* * * * *